United States Patent [19]

DiRoma

[11] 4,135,725
[45] Jan. 23, 1979

[54] REMOVABLE WHEEL AND HANDLE APPARATUS FOR TRASH RECEPTACLES

[76] Inventor: Sabeto DiRoma, 44 Fielding Ter., Uncasville, Conn. 06382

[21] Appl. No.: 825,231

[22] Filed: Aug. 17, 1977

[51] Int. Cl.² ............................................. B62B 1/20
[52] U.S. Cl. .............................. 280/47.26; 16/114 R; 248/129; 403/316; 403/329
[58] Field of Search ................... 280/47.13 R, 47.26, 280/79.2, DIG. 6; 16/114 R, 114 A; 294/15, 92, 27 H; 248/98, 129; 403/329, 330, 316, 379

[56] References Cited

U.S. PATENT DOCUMENTS

| 1,952,444 | 3/1934 | Leopold et al. | 294/15 |
| 2,742,300 | 4/1956 | Carver | 403/329 X |
| 2,890,061 | 6/1959 | Watson | 280/47.26 |
| 3,272,529 | 9/1966 | Rachman | 280/47.13 R |

Primary Examiner—John A. Pekar
Attorney, Agent, or Firm—Robert D. Farkas

[57] ABSTRACT

A removable wheel and handle apparatus for use with trash receptacles such as garbage cans or the like includes a handle adapted to engage the open edge of the trash receptacle, a bracket affixed to the bottom of the receptacle and a wheel assembly adapted to removably receive an extending portion of the bracket. The handle permits easy tilting of the trash receptacle on to the wheel assembly, thereby permitting the receptacle to be readily moved from one place to another. The handle and the wheel assembly may then be removed and applied to another receptacle in a like manner.

4 Claims, 4 Drawing Figures

U.S. Patent  Jan. 23, 1979  4,135,725
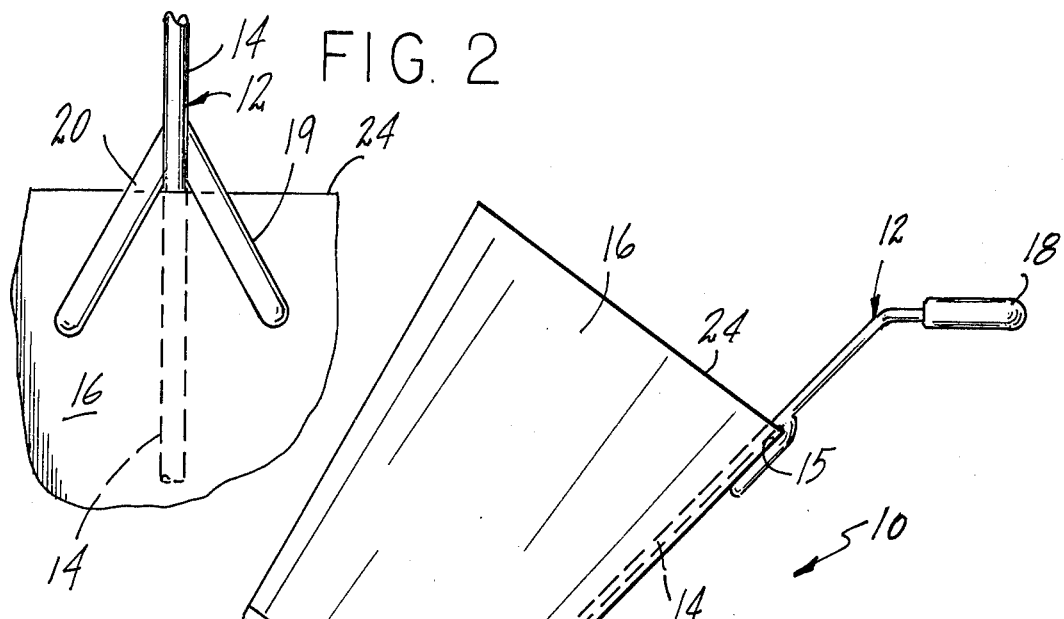
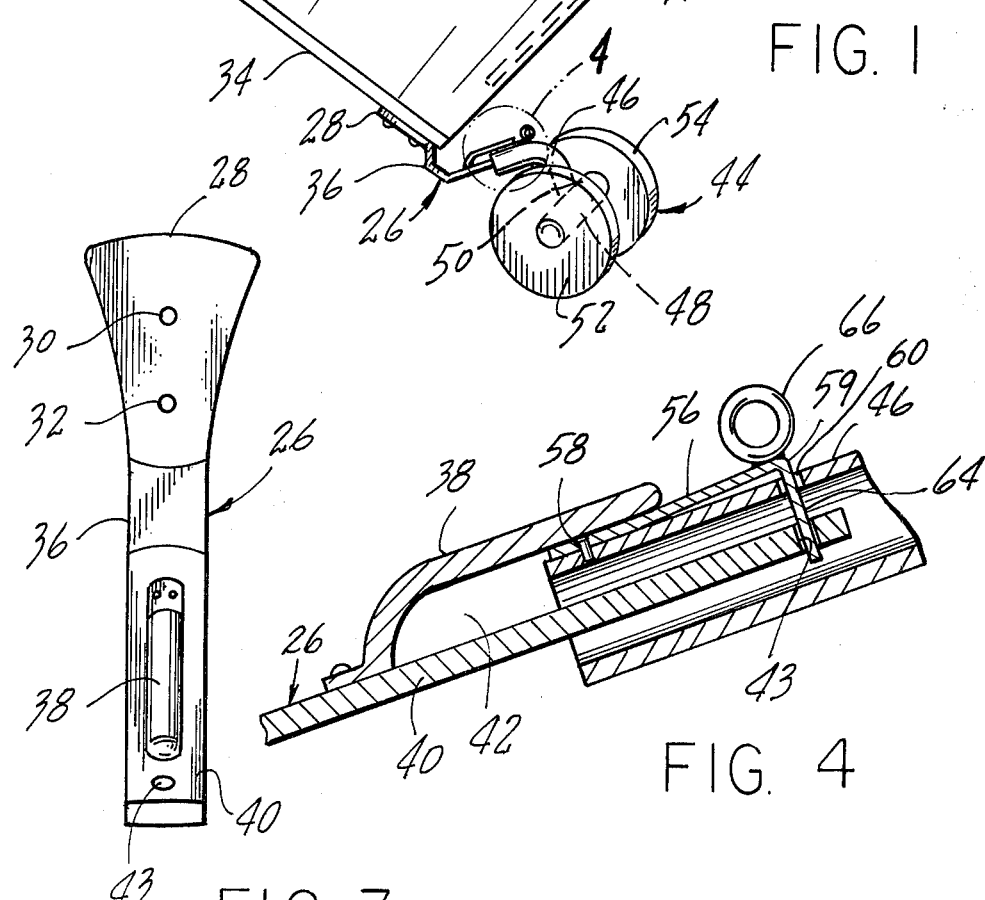

REMOVABLE WHEEL AND HANDLE APPARATUS FOR TRASH RECEPTACLES

BACKGROUND OF THE INVENTION

1. Field of the Invention

The present invention relates to trash receptacle handling apparatuses, and more particularly, to a removable wheel and handle apparatus for use with trash receptacles such as garbage cans, or the like.

2. Description of the Prior Art

Many devices are known in the prior art which may be used to move trash receptacles, such as garbage cans from one place to another. In multiple dwellings, generally the superintendent must move the receptacle from the basement to the curb where it is to be carted away by members of a sanitation crew. Individual home owners, in many instances, are required to move the receptacles from the rear or side of the house where they are stored to the curb to make them available to the sanitation crews.

Typical devices that are used in conjunction with conventional garbage cans are U.S. Pat. No. 3,845,969 issued to M. E. Larson on Nov. 4, 1974, U.S. Pat. No. 3,188,109 issrured to L. K. Broadrick on June 8, 1967, U.S. Pat. No. 3,374,004 issued to R. D. Oliver on Oct. 19, 1966, U.S. Pat. No. 2,930,561 issued to D. D. Bittle on Feb. 24, 1958. All of the above patents are mechanical assemblies or dollys into which the garbage can is installed or placed for movement from one place to another. Each apparatus is relatively expensive to manufacture and not readily detachable from the receptacle associated therewith.

The present invention overcomes the problems associated with the prior art by providing a relatively inexpensive removable handle and wheel assembly which may be used with conventional trash receptacles.

SUMMARY OF THE INVENTION

Therefore, a primary object of the present invention is to provide a removable handle and wheel assembly which may be used with conventional trash receptacles.

A further object of the present invention is to provide a removable handle and wheel assembly for use with conventional trash receptacles which may be manufactured at low cost.

A still further object of the present invention is to provide a handle and wheel assembly which requires a minimum of storage space.

Still another object of the present invention is to provide a handle and wheel assembly that may readily be installed and is easily removed from a trash receptacle.

These objects, as well as, further objects and advantages of the present invention will become readily apparent after reading the description of a non-limiting illustrative embodiment and the accompanying drawing.

A removable wheel and handle apparatus for use with trash receptacles, such as garbage cans, or the like, according to the principles of the present invention, comprises in combination, handle means including an enlongated central portion having a gripping means disposed on one end thereof and a pair of outwardly extending members affixed to the central portion a distance from the gripping means, the outwardly extending members being in one plane displaced from the central portion in a V-shaped configuration providing an opening between the central portion and the outwardly extending V-shaped members, the opening being adapted to receive the open edge of the trash receptacle therebetween; bracket means adapted to be affixed to the bottom of the trash receptacle, the bracket means having a portion extending beyond the outer perimeter of the bottom of the receptacle, the extending portion being provided with an upper portion and a lower portion forming an opening therebetween, the extending lower portion being provided with an aperture, and wheel assembly means having a tubular center portion terminating in an axle having a pair of wheels rotatably mounted thereon, the central portion being disposed between the wheels, the other end of the tubular center portion being provided with a leaf spring means affixed thereon at one end, the other end of the leaf spring extending towards the wheels, the leaf spring other end being bent 90° and extending into an opening of the tubular center portion and adapted to cooperate with the extending lower portion aperture when the lower portion is inserted into the tubular center portion.

BRIEF DESCRIPTION OF THE DRAWING

In order that the invention may be more fully understood, it will now be described, by way of example, with reference to the accompanying drawing in which:

FIG. 1 is a pictorial representation of a handle and wheel assembly affixed to a garbage can, according to the principles of the present invention;

FIG. 2 is an enlarged partial view taken in the direction of line 2—2 of FIG. 1;

FIG. 3 is a top plan view of a bracket which is affixed to the trash receptacle; and FIG. 4 is an enlarged partial cross-sectional view of the area shown within the circle of dashed lines labled 4 in FIG. 1.

DESCRIPTION OF THE PREFERRED EMBODIMENT

Referring now to the figures, and more particularly to FIG. 1 showing a trash receptacle handling apparatus 10 which in the preferred embodiment of the invention, includes a handle member 12 which is provided with an elongated central portion 14 which extends in a downwardly direction into a trash receptacle or garbage can 16. One end of the central portion 14 is provided with a gripping means 18 fabricated of a resilient shock absorbing material so that when the receptacle is rolled over cracks, up steps, or up or down a curb, the shock is not imparted to the person moving the receptacle.

A pair of outwardly extending members 19 and 20 are affixed to the central portion a distance preferably equal to approximately one-third the length of the central portion 14 and are in one plane displaced from the central portion 14 forming an opening therebetween 15 for receiving the edge 24 of the trash receptacle 16. (Refer to FIG. 2.)

A bracket 26 preferably has a fan shaped portion 28 which is provided with a pair of apertures 30 and 32. Apertures 30 and 32 are utilized to mount the bracket 28 to the bottom surface 34 of the trash receptacle 16 by conventional means, such as a pair of nuts and bolts, not shown. A curved portion 36 of bracket 26 is designed to curve around the lip portion found on the bottom circumference of some trash receptacles in addition to providing the proper angle to permit easy movement of the trash receptacle 16. A portion of the bracket 26 extends beyond the outer circumference of the bottom surface 34 of receptacle 16 and has an upper overlying portion 38 and a lower or end portion 40 forming an opening 42 therebetween as shown in FIG. 4. The lower portion 40 is provided with an elongated aperture 43 whose function will be explained hereinafter.

A wheel assembly 44 has a tubular center portion 46 having an axle 48 inserted therethrough at one end 50, with a pair of wheels 52 and 54 rotatably mounted thereon, in a conventional manner, with the central portion 46 disposed between the wheels 52 and 54. The other end of said tubular center portion 46 has a leaf spring 56 affixed thereon by means of a rivet 58. The other end 59 of leaf spring 56 extends towards the wheels 52 and 54 and is bent downwardly 90° extending into the central opening 60 of the tubular center portion 46. The end 64 of leaf spring 56 is adapted to be received by and cooperate with aperture 43 provided in the lower extending portion 40 of bracket 26 when bracket 26 is inserted into opening of the tubular center portion 46. A lifting means 66 preferably in the form of a ring is affixed to the end 58 of leaf spring 56 proximate the 90° end to permit the leaf spring 56 to be readily raised out of aperture 43, thus releasing the wheel assembly 44 from the bracket when desired.

In operation the bracket 26 is affixed to the bottom surface 34 of the receptacle 16 and it remains there permanently. The wheel assembly 44 is then placed over the extending lower portion 40 of bracket 26 until the leaf spring 56 enters the aperture 42, thereby locking it in position. The elongated central portion 14 of handle member 12 is placed over the edge 24 of receptacle 16 until opening 15 receives the edge 24 therein holding the receptacle edge 24 between the central portion 14 and the outwardly extending members 18 and 20. Pulling outwardly on gripping means 18 permits the receptacle 16 to be tilted upon the wheels 52 and 54, thus permitting the receptacle to be moved easily.

To remove the wheel assembly 44 from the bracket 26, it is required to apply upward lifting pressure on ring 66 until leaf spring 56 clears aperture 42, then rearward pressure on the wheel assembly 44 will remove it from bracket 26 for use on another receptacle. Exerting pressure in an upwardly direction will remove the handle member from the receptacle for use elsewhere, also.

Therefore, a primary advantage of the present invention is to provide a removable handle and wheel assembly which may be used with conventional trash receptacles.

A further advantage of the present invention is to provide a removable handle and wheel assembly for use with conventional trash receptacles which may be manufactured at low cost.

A still further advantage of the present invention is to provide a handle and wheel assembly which requires a minimum of storage space.

Still another advantage of the present invention is to provide a handle and wheel assembly that may readily be installed and is easily removed from a trash receptacle.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed is:

1. A removable wheel and handle apparatus for use with trash receptacles, such as garbage cans, or the like comprising, in combination:

handle means including an elongated central portion having a gripping means disposed on one end thereof and a pair of outwardly extending members affixed to said central portion a distance from said gripping means, said outwardly extending members being in one plane displaced from said central portion in a V-shaped configuration providing an opening between said central portion and said outwardly extending V-shaped members, said opening being adapted to receive the open edge of said trash receptacle therebetween;

bracket means adapted to be affixed to the bottom of said trash receptacle, said bracket means having an end portion and an overlying portion, said overlying portion overlying said end portion, said end portion and said overlying portion forming an opening therebetween, said end portion and said overlying portion extending beyond the outer perimeter of the bottom of said receptacle, said extending end portion being provided with an aperture, and wheel assembly means having a tubular center portion, an axle, said axle secured to said tubular portion and having a pair of wheels rotatably mounted on said axle, said center portion having a passageway therein, said center portion being disposed between said wheels, the other end of said tubular center portion being provided with a leaf spring means affixed to said center portion at one end thereof, the other end of said leaf spring extending towards said wheels, said center portion having a hole therein communicating with said passageway, said leaf spring other end being bent 90° and extending in said hole of said tubular center portion and into said passageway, said other end of said leaf spring being disposed removably engaging said aperture in said end portion when said end portion of said bracket means is inserted in said passageway and said aperture is aligned with said hole, whereby said bracket means is removably secured to said wheel assembly means upon the displacement of said other end of said leaf spring into and out of engagement with said aperture in said end portion of said bracket means.

2. The removable wheel and handle apparatus according to claim 1 wherein said leaf spring is provided with a lifting means proximate said other end thereof for removing said leaf spring other end from said aperture in said extending end portion.

3. The removable wheel and handle apparatus according to claim 2 wherein said lifting means is a ring-shaped device affixed to said leaf spring other end proximate said 90° bend.

4. The removable wheel and handle apparatus according to claim 1 wherein said gripping means is made of a resilient shock absorbing material.

* * * * *